United States Patent [19]
Miller et al.

[11] Patent Number: 5,222,003
[45] Date of Patent: Jun. 22, 1993

[54] OPTICAL TAPE POSITION SENSING SYSTEM FOR MAGNETIC TAPE MEDIA IN COMPUTER MEMORY BACKUP DEVICES

[75] Inventors: Kevin L. Miller; Alan J. Richards, both of Loveland, Colo.; James A. Imthurn, Rathdrum, Id.

[73] Assignee: Colorado Memory Systems, Loveland, Colo.

[21] Appl. No.: 612,891

[22] Filed: Nov. 13, 1990

[51] Int. Cl.5 .......................................... G11B 15/08
[52] U.S. Cl. .................................................. 360/74.6
[58] Field of Search ...................................... 360/74.6

[56] References Cited

U.S. PATENT DOCUMENTS

| | | | |
|---|---|---|---|
| 3,566,132 | 2/1971 | Walker | 250/214 |
| 3,776,488 | 12/1973 | Young et al. | 242/183 |
| 3,931,513 | 1/1976 | Germain | 250/205 |
| 4,343,024 | 8/1982 | Kawai | 360/74.6 |
| 4,390,751 | 6/1983 | Jacobson | 179/6.07 |
| 4,410,148 | 10/1983 | Dunlap | 242/188 |
| 4,570,075 | 2/1986 | Spiero | 250/570 |
| 4,616,274 | 10/1986 | Nagaoka | 360/71 |
| 4,631,618 | 12/1986 | Ozawa et al. | 360/132 |
| 4,740,857 | 4/1988 | Ogawa | 360/132 |
| 4,763,217 | 8/1988 | Oishi | 360/132 |
| 4,783,022 | 11/1988 | Onmori et al. | 242/199 |
| 4,842,177 | 6/1989 | Callender | 226/97 |
| 4,848,698 | 7/1989 | Newell | 242/188 |
| 4,862,305 | 8/1989 | Katagiri et al. | 360/132 |
| 4,901,171 | 2/1990 | Urayama et al. | 360/74.6 |
| 4,918,558 | 4/1990 | Igaraski et al. | 360/132 |

OTHER PUBLICATIONS

Author: ANX TC X3B5; Title: Unrecorded Magnetic Mini Tape Cartridge for Information Interchange; date unknown.

Primary Examiner—Robert S. Tupper

[57] ABSTRACT

A computer memory backup device which utilizes magnetic tape media having aperture indications at the beginning-of-tape (bot) and the end-of-tape (eot) for accomplishing the sensing of the same is disclosed. The present invention utilizes a light pipe for directing the emitted electromagnetic radiation from an isolated source to the magnetic tape media, and focuses the radiation in proximity to the media. An integral focusing lens disposed on the exit end of the light pipe serves to converge the exiting electromagnetic radiation in this fashion. The electromagnetic radiation source, shown as a light emitting diode, is pulsed in a manner such that accuracy, as well as energy conservation, is greatly increased. A time domain filtering method is employed as a means to further enhance the system's accuracy in sensing the beginning-of-tape and end-of-tape. The devices accommodate standard aperture indications as required by ANSI specifications in both dimensional and placement aspects. When these aperture indications reach the area at which the electromagnetic radiation is being focused they permit the electromagnetic radiation to pass through the magnetic tape media at which point the electromagnetic radiation is sensed. A determination is then made appropriately as to either the beginning-of-tape or end-of-tape.

30 Claims, 5 Drawing Sheets

OPTICAL TAPE POSITION SENSING SYSTEM FOR MAGNETIC TAPE MEDIA IN COMPUTER MEMORY BACKUP DEVICES

BACKGROUND OF THE INVENTION

Generally, the invention relates to the field of computer memory backup devices which utilize magnetic tape media focusing upon techniques for sensing the position of such tape media. More specifically, the present invention focuses upon techniques for sensing the beginning-of-tape (bot) and end-of-tape (eot) positions in a perforated magnetic tape media.

Since the advent of programmable information processing systems, or computers, the need to store information has grown dramatically. This information storage is frequently accomplished through devices which interconnect with the computer and act relatively independently of it in response to signals received from the main data processing functions of the computer. These devices, known as peripheral devices, act to receive data from the main computer memory and then to store such data on a separate media within the peripheral device.

One of the aspects of typical memory devices and computer systems is their volatility—they can unintentionally loose their contents occasionally. To overcome this limitation, backup devices have evolved. Such devices serve the simple function of separately storing large amounts of data on relatively non-volatile media. In the field of these specialized devices, the use of magnetic tape media has greatly eclipsed all other types of uses. This use is so broad that magnetic tape cartridges which are specifically designed to be used with computer backup devices have been developed. Such cartridges specifically meet the needs of computer users in a standardized and optimum manner.

The present invention focuses upon standardized magnetic tape cartridge systems, such as are frequently used in computer tape backup systems. The American National Standards Institute defines "magnetic tape" as tape that "accepts and retains magnetic signals intended for input/output and storage purposes for information processing and associated systems." The "standardized" magnetic tape cartridge ensures that the use of the tape cartridge for computer memory backup will be optimal, as opposed to other types of media systems which might require accommodation of existing designs.

An aspect of utilizing magnetic tape media in cartridge form is that such media is designed as a continuous segment having a beginning and an end. Since magnetic tape is moved in front of the sensor at relatively rapid speeds (ranging in excess of 90 inches per second) the need for accurate sensing of the beginning and end of the tape is acute. Failure to sense either the beginning or end of the tape may result in damage to the tape media.

These circumstances have led to the development of several techniques for sensing the beginning and end of a magnetic tape. As one example, two distinct reflective markers are positioned at appropriate locations on the tape. A light source is then reflected off such markers and separately sensed to make the determination as to beginning or end of tape. In U.S. Pat. No. 4,410,148 to Dunlap, such a system is explained. In a second example, as shown in U.S. Pat. No. 4,763,217 to Oishi, transparent leaders are used. These transparent leaders allow the transmission of light beams through the beginning and ends of the tapes for appropriate sensing and determination. One of the more advanced ways of sensing tape position, and that involved in the present invention, is that of using aperture indications. Such aperture indications are actually small holes placed at specific points and in specific configurations at either extreme of the tape.

An example of the placement of such aperture indications is set forth in the American National Standard Institute (ANSI) specification applicable to computer tape cartridges. In this specification, standards which require these holes to have a diameter of 0.046 inches ±0.002 inches (1.17 mm±0.05 mm) are set forth. The specification continues to add that these holes should be positioned in arrangements such that a light sensing means can be utilized.

In addition to setting forth such specifications, the ANSI standards advocate through example the use of a tungsten lamp or light emitting diode as a light source having a specific wave length emission. It is then suggested that this emission then be sensed through use of a silicon photo diode. This relatively simple method of sensing magnetic tape position has become firmly established for computer tape backup systems through the compliance with specifications and standards as they relate to the tape cartridges used in computer memory backup devices. In establishing standards, many of these specifications have actually acted to limit the techniques utilized by those skilled in the art of designing computer memory backup devices. Since the specifications set detailed standards which are widely accepted and adhered to, those skilled in the art have been led away from changes which might actually optimize many desirable aspects.

Among the aspects well known to be desirable are issues relating to maximizing sensitivity and minimizing energy consumption. As to the first, maximizing sensitivity, those skilled in the art of sensing tape position in magnetic tape backup devices have long felt the need to achieve better performance. The standards, however, have served to direct them away from the solutions discovered by the present invention even though the implementing arts have long been available. This was perhaps due to the fact that while those skilled in the art recognized the need for maximizing sensitivity, they failed to appreciate that one element of the problem lay in focusing upon the transmission of the light (or, more properly, electromagnetic radiation) through the aperture indications, not on the silicon photo diode or not at all. Instead, the specification implicitly, and other references explicitly have acted to teach away from the direction taken by the present invention. Those skilled in the art simply did not expect such advances to be possible without modification of the existing cartridges—and therefore the ANSI standard. In sharp contrast to the preconceptions developed and propounded, the present invention provides expanded capabilities with respect to accuracy, energy use, and efficiency in a system which adheres to the promoted standards.

In this regard, U.S. Pat. No. 4,848,698 to Newell, et al., acknowledges the use of ANSI standards as a source which dictates the positioning of the beginning-of-tape and end-of-tape indicia. Newell teaches the use of transparent leaders, but comments on the use of apertures (holes) in magnetic tape as they relate to the sensing of the tape beginning and end. Newell rejects this method as unacceptable because, he says, "holes must be made small or they weaken tape," but "holes must be large enough to distinguish from 'pinholes'." The present invention overcomes these problems by accommodating existing "undesirable" aperture size, and by using a filtering method to distinguish "pinholes."

SUMMARY OF THE INVENTION

The present invention is directed to an improved system for optically sensing beginning-of-tape and end-of-tape aperture indications in magnetic tape media as used by computer memory backup devices. This improved system achieves increased accuracy in such sensing while at the same time minimizing power and manufacturing expense. It is also an object of the present invention to improve upon existing systems while retaining the ability to be used with standardized magnetic tape cartridge media in computer memory backup devices. It is still a further object of the invention to accommodate existing aperture size while also permitting distinction from possible tape "pinholes."

An important object of the present invention is to provide a means independent of the magnetic tape media, which maximizes the transmission of electromagnetic radiation through the aperture indications in the media. As part of this object, the present invention discloses a system which allows the electromagnetic radiation to be focused in such a manner that the greatest degree of accuracy is achieved.

Yet another object of the present invention is to provide a system for such devices which increases accuracy through manipulation of the electromagnetic radiation emission and its sensing means. Again, the object is to achieve increased accuracy in a manner such that the improved system can be utilized with existing standardized magnetic tape media. Additionally, an object is to design a system which can also be implemented through only minor modifications of existing computer memory backup devices. The present invention also achieves the object of avoiding the effects of electrical noise in the sensing mechanism used for tape position sensing.

A further object of the invention is to provide an improvement whereby the energy required can be significantly minimized. In conserving the energy utilized by a means for sensing beginning-of-tape and end-of-tape aperture indications, the invention again is designed to be easily implemented in existing systems as well as to be utilized with no modification required of the standardized media.

A further object of the present invention is to provide a filtering method in conjunction with the electromagnetic radiation emission source to thereby increase the accuracy of the system. In achieving this object, the present invention discloses methods of filtering which not only can be achieved with inexpensive devices, but which accommodate the peculiarities of such devices, which filter out optical and electrical noise, and which can be easily implemented in existing designs. It is also an object of the invention to comply with required ANSI specifications for aperture dimensions and placement in a magnetic tape media. Naturally, further objects of the invention are disclosed throughout other areas of the specification and claims.

DETAILED DESCRIPTION OF THE PREFERRED EMBODIMENT

Figure 1A:
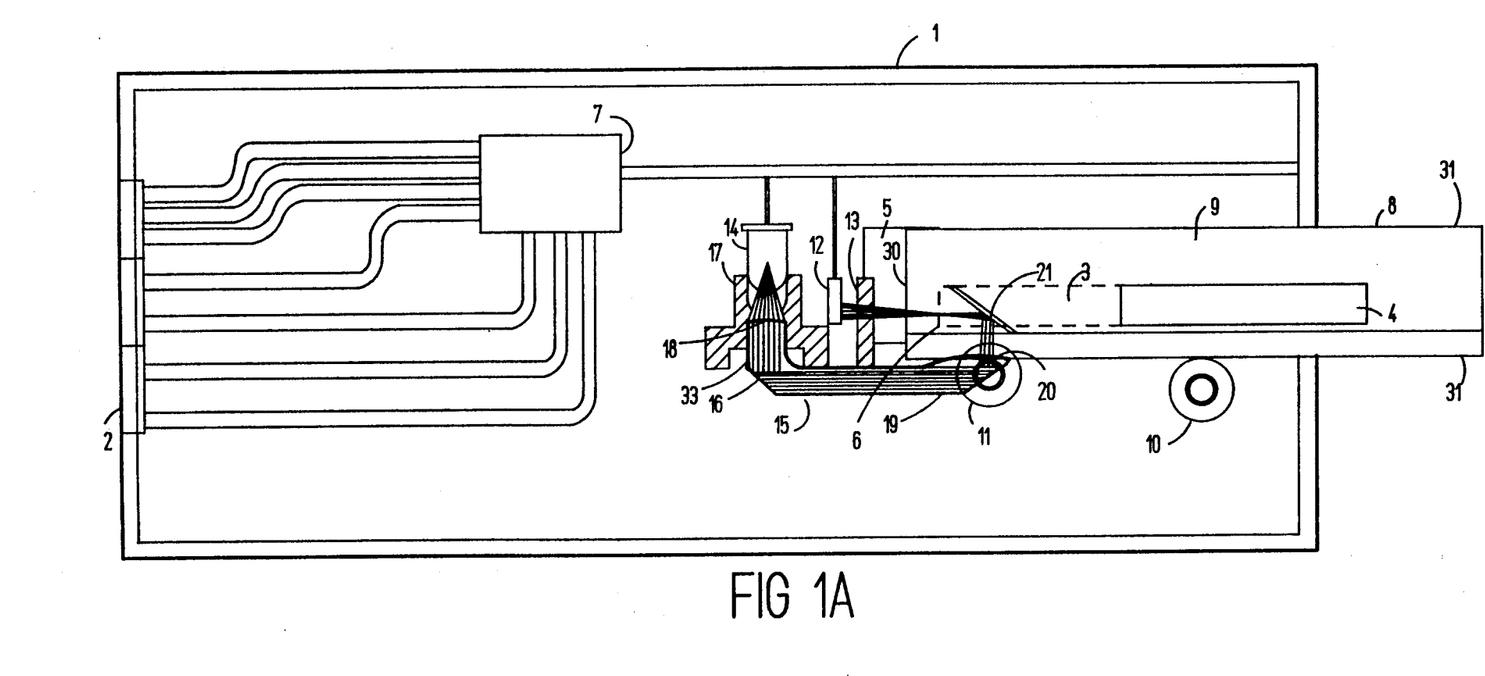
FIG. 1a is a cross-sectional view of an embodiment of the present invention with a tape cartridge present.

The present invention can be embodied in several different ways. FIG. 1a shows one embodiment which is designed to integrate into devices utilizing quarter-inch cartridge media in a simple form. Importantly, computer tape memory media (3) is contained within computer tape cartridge (8). Computer tape cartridge (8) is designed to be easily removed from computer memory backup device (1) as required by the user. Computer memory backup device (1) is connected to computer, not shown, through computer interconnection (2). Computer interconnection (2) allows for interchange of information between computer memory backup device (1) and the computer. This information or data is stored in any of the various forms known to those skilled in the art on computer tape memory media (3). Computer tape memory media (3) is wound on spool (4) in a manner so as to pass in front of magnetic head (5) at access region (6). Magnetic head (5) acts to sense the data and transfer it to controller (7). Controller (7) then transfers data with or without some internal conversion to computer through computer interconnection (2).

Controller (7) can be any possibility of circuitry or devices as are known to those skilled in the art. Essentially controller 10 (7) need only act to effect proper operation of computer tape memory media (3) and to transfer data or information between the computer or its other peripheral devices and computer tape memory media (3). The way in which controller (7) achieves such objects can vary from a simple interconnection to a fully programmable device in its own right. Certainly in the latter designs, data manipulation and variable programming is possible. Controller (7) may thus include its own programmable data processor and data storage capabilities. In the event a microprocessor with programmable features is used, some of the features of the present invention can even be embodied in software or programming which then directs either the computer, or controller (7), to accomplish the desired ends.

Figure 4:
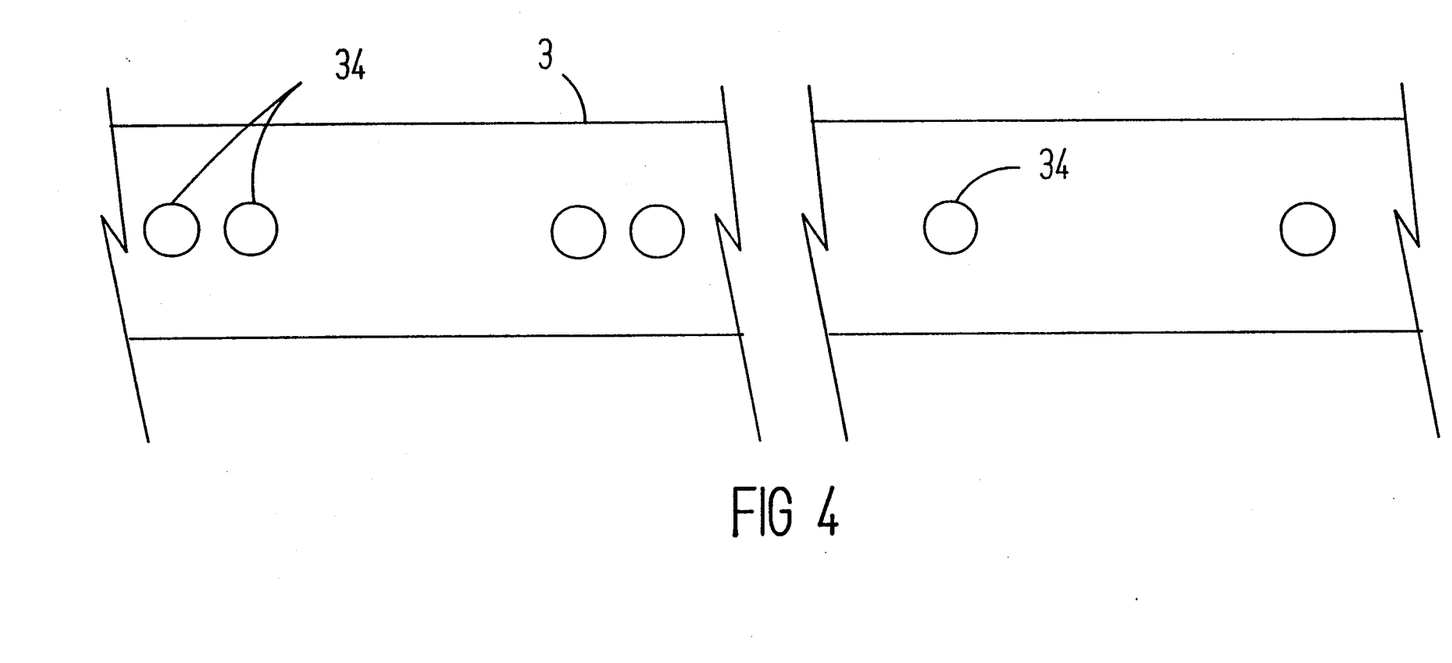
FIG. 4 shows the tape memory media with aperture indications.

To allow for broadly expandable memory capability, the computer memory backup device (1) is designed to allow removal and reinsertion of a variety of computer tape cartridges (8). As mentioned earlier, in the particular industry standards have evolved such that computer tape cartridge (8) may be manufactured by a variety of entities and yet be usable in a variety of computer memory backup devices regardless of the manufacturer. As a result of these standards, computer tape cartridge (8) includes standardized container (9). For uniformity, standardized container (9) conforms to the specifications established by the American National Standards Institute (ANSI) mentioned earlier. While other types of media are certainly possible, such have not been optimized for use in a computer memory backup device. Through the development of the ANSI standards, computer tape cartridge (8) has been refined to be optimal in terms of memory storage capabilities. In addition, computer memory backup devices have been designed to accommodate such standardized cartridges. In addition to standardized container (9), the ANSI specifications also set standards for the placement of beginning-of-tape and end-of-tape aperture indications (34) in tape media (3), as shown in FIG. 4.

To allow expanded memory capabilities and other features, computer memory backup device (1) is designed to include a means for releasably accepting standardized container (9). Certainly, the means for releasably accepting standardized container (9) can vary so long as it is consistent with the features contained in standardized container (9). For simplicity purposes, the means for releasably accepting standardized container (9) is shown in FIG. 1a simply as a series of retaining wheels (10) and moveable wheel (11). Moveable wheel (11) is configured so as to allow displacement in order to engage standardized container (9).

In addition to receiving signals from magnetic head (5), controller (7) is designed to receive signals from optical tape position sensor (12). Optical tape position sensor (12) is placed in shielded mounting (13). In this position, optical tape position sensor (12) is designed to receive optical signals emitted by a means for emitting electromagnetic radiation. As shown in FIG. 1a, the means for emitting electromagnetic radiation is light emitting diode (14). Light emitting diode (14) emits electromagnetic radiation typically in the near infrared spectrum. Unique to the present invention is the fact that light emitting diode (14) emits the electromagnetic radiation at some distance from computer tape cartridge (8). The electromagnetic radiation emitted by light emitting diode (14) is transferred to the cartridge through a suitable means for directing the electromagnetic radiation. As shown in FIG. 1a, the means for directing the electromagnetic radiation is light pipe (15). Certainly, other types of means for directing the electromagnetic radiation could be used and should be considered to fall within the scope and spirit of the present invention. One such alternative type of system might involve the use of optical fibers or the like.

Controller (7) also includes a means for sensing the position of aperture indications (34). The means for sensing aperture indications (34) is accomplished by including a means for maximizing the transmission of the electromagnetic radiation through aperture indications (34). As mentioned earlier, this means for maximizing the transmission through aperture indications (34) does not require any modification of existing standardized tape cartridges. While certainly other techniques are possible for maximizing the transmission of the electromagnetic radiation, they are specifically avoided by the present invention because modification of such media is typically required. In addition, such other devices or techniques do not maximize the transmission through the aperture indications. Some may provide greater amounts of electromagnetic radiation, but they do not maximize the portion which goes through the aperture indications.

Figure 1B:
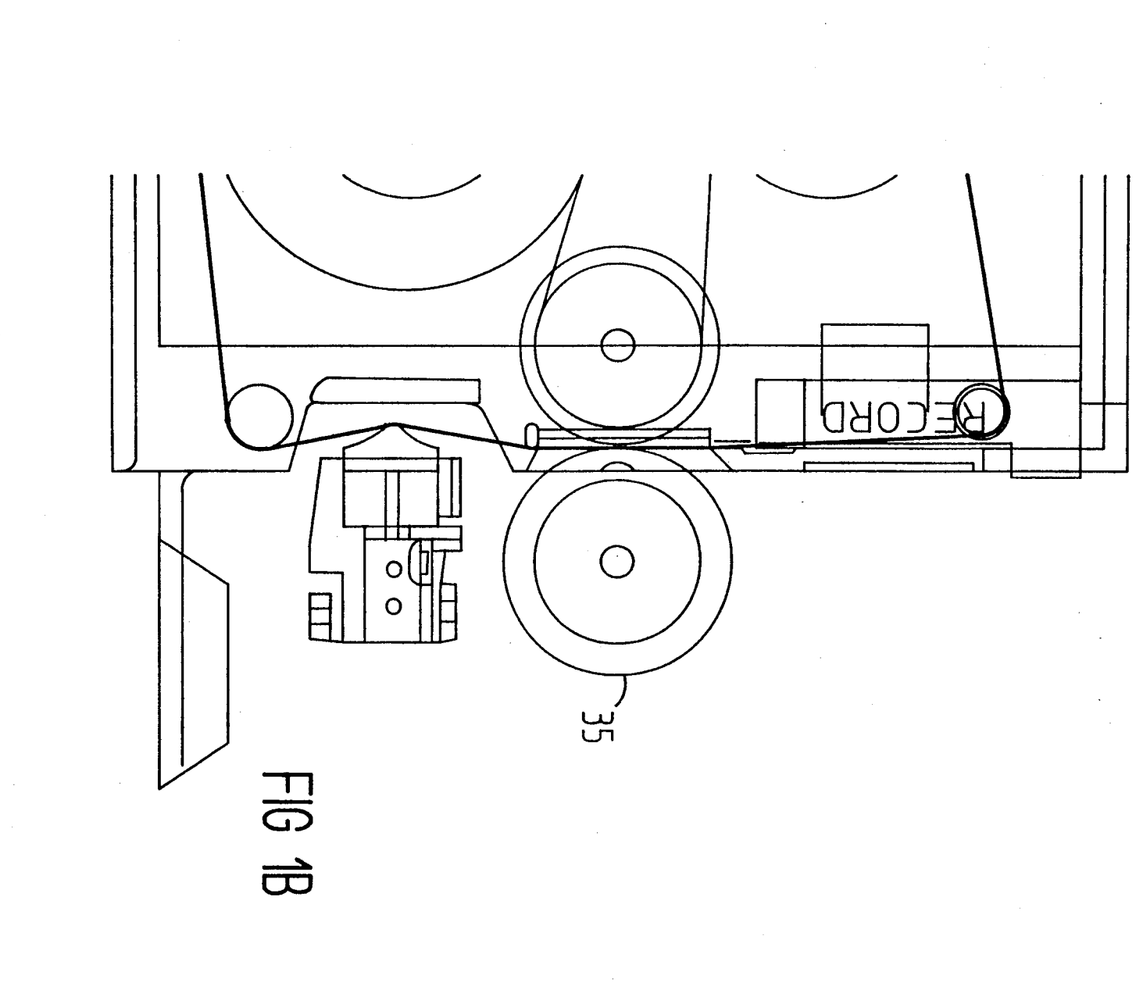
FIG. 1b is a top view of the embodiment of the present invention with a tape cartridge present.

In operation, controller (7) receives the signals from optical tape position sensor (12). Optical position sensor (12) can be a variety of sensors, for instance a phototransistor. Optical tape position sensor (12) would then react whenever electromagnetic radiation is allowed to pass through computer tape memory media (3). Upon the appropriate sensing, controller (7) would then act to stop drive mechanism (35) in manners which are well known to those skilled in the art. While drive mechanism (35) is shown schematically in FIG. 1b as a type which engages computer tape cartridge (8) in the vicinity of access region (6) (actually behind magnetic head (5)), the types of drives are certainly possible.

As mentioned earlier, this embodiment includes a means for directing the electromagnetic radiation. This means is light pipe (15) which has the property of total refraction of the electromagnetic radiation emitted by light emitting diode (14). It thus passes the electromagnetic radiation from light emitting diode (14) towards appropriate areas of computer tape cartridge (8). Light pipe (15) also includes reflective surfaces (16). In addition, light pipe (15) may be mounted within emission shields (17). Emission shields (17) function similarly to and serve the same purposes to shielded mounting (13). They block stray radiation. Light pipe (15) has both an input end (33) and an exit end (19).

On input end (33), light pipe (15) includes integral collecting lens (18). Integral collecting lens (18) serves to transfer as much electromagnetic radiation from light emitting diode (14) to light pipe (15) as possible. In addition to simply passing electromagnetic radiation from one place to another, light pipe (15) includes a means for focusing the electromagnetic radiation. The means for focusing can be an integral focusing lens (20), as shown on the exit end (19) of light pipe (15).

In accordance with the design standards set forth in the ANSI specifications, computer tape cartridge (8) includes some means for aiming the electromagnetic radiation through computer tape media (3) at access region (6). This means for aiming is typically integral mirror assembly (21). Integral mirror assembly (21) may be mounted in a fixed manner within standardized container (9). In this fashion, it directs the electromagnetic radiation through aperture indications (34) in the computer tape memory media (3) at access region (6) such that the electromagnetic radiation is then received and sensed by optical tape position sensor (12). Standardized container (9) also includes first and second cartridge faces (31) which aid in properly positioning computer tape cartridge (8) for reliable alignment.

In normal operation, with computer tape cartridge (8) appropriately placed within computer memory backup device (1), electromagnetic radiation emitted from light emitting diode (14). It is then collected by integral collecting lens (18) and passed through light pipe (15). In exiting light pipe (15), the electromagnetic radiation is focused through integral focusing lens (20). It then passes through a port in standardized container (9) and onto integral mirror assembly (21). Integral mirror assembly (21) then directs the electromagnetic radiation at right angles to pass onto computer tape memory media (3). When aperture indications (34) are present, the electromagnetic radiation passes through computer tape memory media (3) and is then received by optical tape position sensor (12).

Figure 3:
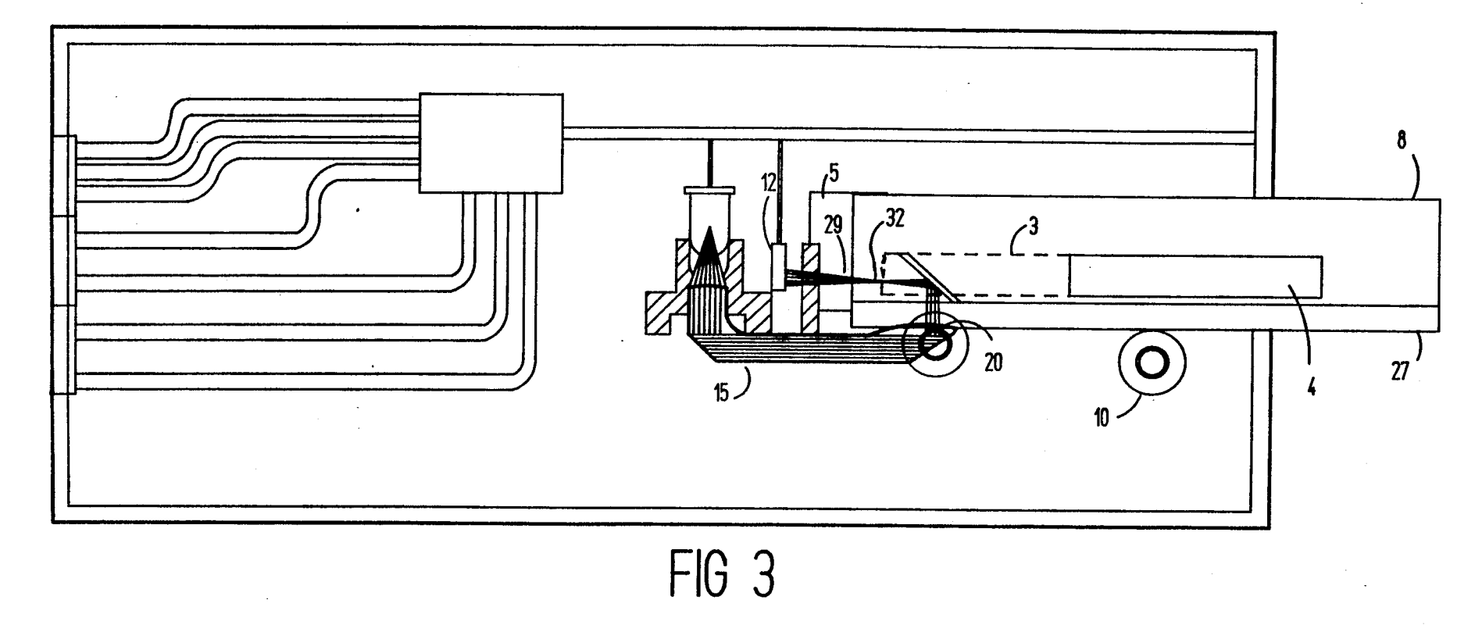
FIG. 3 is a schematic showing the focus of the electromagnetic radiation emitted by the light emitting diode.

Referring to FIG. 3, another element of the present invention can be understood. As mentioned with reference to FIG. 1b, light pipe (15) includes integral focusing lens (20). Integral focusing lens (20) serves to direct electromagnetic radiation at appropriate places. While the tendency has been to either position the means for emitting electromagnetic radiation as close as possible to computer tape cartridge (8) (as taught by the ANSI specification) or to position optical tape position sensor (12) at a point where the electromagnetic radiation is focused for maximum sensitivity, the present invention actually achieves the opposite. As can be seen in FIG. 3, electromagnetic radiation traverses path (29) from integral focusing lens (20) to optical tape position sensor (12). Through action of integral focusing lens (20), the electromagnetic radiation meets at focal point (32). The amount of power per area received is at its maximum at focal point (32). As those skilled in the art may have previously recognized, positioning optical tape position sensor (12) to coincide with focal point (32) (if one were to exist) would appear to create a condition of greatest sensitivity for optical tape position sensor (12). As the present invention recognizes, this is not, in fact, the case. As can be seen from FIG. 3, the electromagnetic radiation is designed to be directed at computer tape memory media (3). By focusing the electromagnetic radiation at focal point (32) such that focal point (32) approximately coincides with computer tape memory media (3), the maximum transmission through computer tape media (3) is achieved when an aperture indication (34) is appropriately positioned. Rather than maximizing the sensitivity by focusing on optical tape position sensor (12), the present invention realizes that if focus is considered, the optimal point is actually at a different point than that expected.

An ancillary benefit of making focal point (32) to approximately coincide with computer tape media (3) is that of accommodating manufacturing imprecisions. Since optical tape position sensor (12) can have a small sensing area, positioning of optical tape position sensor (12) can be very sensitive. For instance, if optical tape position sensor (12) were placed slightly to the side of path (29), the sensing system could become inoperative. To allow for manufacturing expediency and lesser costs, integral focusing lens (20) focuses the electromagnetic radiation at a point which does not coincide with optical tape position sensor (12). This allows optical tape position sensor (12) to be placed without any unusual alignment or other tolerances necessary.

As mentioned, one of the goals of the present invention is to avoid the effects of electrical noise in the means for sensing tape position. Prior to the present invention, this aspect was either ignored or viewed as a "necessary evil" by those skilled in the art. This was because it was felt that for maximum sensitivity the means for emitting electromagnetic radiation and the means for receiving electromagnetic radiation had to be in close proximity. In this regard the teachings of the ANSI specification furthered this preconception. Since standardized container (9) is designed made of aluminum or some other metallic material for durability reasons, and electrical charge and heat dissipation, light emitting diode (14), and anything else in its vicinity, can be subject to some electrical interference. This is overcome in the present invention by including a means for insulating the means for sensing from the effects of electrical noise. A number of techniques could be utilized such as encasing and grounding the means for sensing. For simplicity a means for separating is utilized in this embodiment. The means for separating the means for sensing (in this case the light emitting diode (14)) from standardized container (9) and its base plate (27) avoids any accumulation of charge. In this embodiment, the means for separating is light pipe (15), as mentioned earlier. While such a simple aspect as standardized container (9) might appear to be unremarkable, the simple fact that ANSI standards show light emitting diode (14) or some other type of light source to be placed in just such a position, led those skilled in the art to utilize this configuration without question. Again, light pipe (15) is only one way of accomplishing this goal; optical fibers or the like are alternatives which may also be used. In addition to separating light emitting diode (14) from base plate (27), optical tape position sensor (12) could also be so separated. Since both the use of a light emitting diode and a phototransistor are preferred, and since each of these devices are especially subject to electrical interference, this aspect of the invention can by itself represent a significant improvement from manufacturing and performance perspectives.

Figure 2:
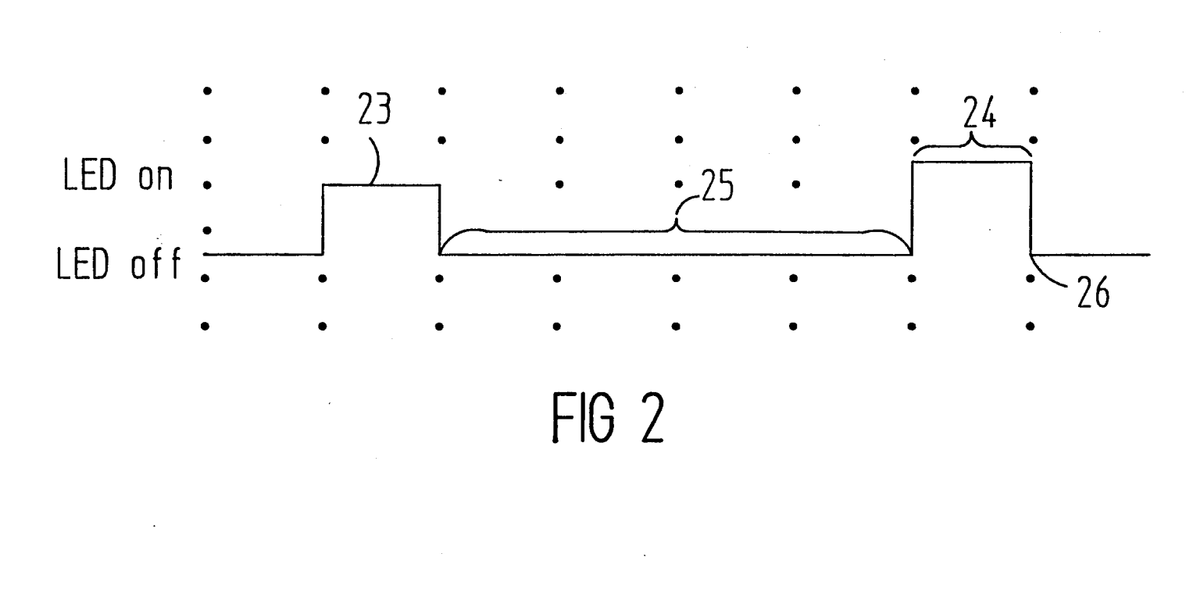
FIG. 2 is a plot of the electromagnetic radiation as sensed by the optical tape position sensor at some portion of time.

Another aspect of the present invention is that of conserving energy. Although most means for emitting electromagnetic radiation are fairly efficient, two aspects make this aspect very important in the field of computer memory backup devices. First, most such devices are powered through the main computer's power supply. Since this is of limited capability, any savings by peripheral devices are important. Second, the need to dissipate the power generated by the means for emitting electromagnetic radiation must be met. To accommodate each of these needs, the means for emitting electromagnetic radiation is pulsed, rather than continuously on, as in most prior tape backup devices. Referring to FIG. 2, it can be seen that the output of light emitting diode (14) is "on" much less than it is "off." This conserves energy. It also has the added advantage of allowing the use of a less expensive light emitting diode (14), or extending its life, or both. Since most means for emitting electromagnetic radiation have a maximum continuous current rating, and since this rating can be surpassed when pulsing the device, greater emission can be obtained with no cost increase. In addition, most means for emitting electromagnetic radiation also have average lifetimes. Again, by pulsing this is usually significantly extended with no cost. Since such lengthened lifetime is not simply proportional to the "on" time percentage, this aspect can be significant.

An aspect of the present invention is that it is designed to increase the accuracy of the sensing means. Since stray signals are always possible, some type of filtering is usually desirable. One possibility could be to pulse the means for receiving electromagnetic radiation. This technique limits the possibility of an erroneous determination of beginning-of-tape or end-of-tape to the time the receiving means is enabled or read. Another possibility is that light emitting diode (14) may be pulsed. This pulsing is not only economical in that it serves to prolong the life of light emitting diode (14) and save energy as mentioned earlier, but it also allows for time domain filtering.

Time domain filtering is a technique whereby a repetitive number of pulses may be sensed by optical tape position sensor (12) before a determination of beginning-of-tape or end-of-tape is made. This technique can be readily understood by those skilled in the art even though it is believed that the technique has never been used in this manner. Referring to FIG. 2 it can be seen that using a simple pulse function on light emitting diode allows for simple time domain filtering. For efficiency sake, the testing for the presence of two consecutive pulses could be utilized to determine the presence of an aperture indication within the media. The pattern in which these apertures are sensed allows the proper determination between the beginning-of-tape indication and the end-of-tape indication—single apertures indicate end-of-tape while double apertures indicate beginning-of-tape as set forth in the ANSI standards. Naturally, the sensing or absence of sensing two or more consecutive pulses is certainly possible for greater accuracy. The sensing of two or more consecutive pulses in the correct pattern then triggers controller (7) to disable tape drive mechanism (35) thereby halting the progress of tape media (3) as well.

In accomplishing the time domain filtering, as mentioned a minimal amount of filtering can be provided by simply sensing two consecutive pulses. In order to accomplish this type of technique, the pulses must be spaced in such a fashion that when given the speed with which the tape travels (approximately 90 inches per second) and the diameter of aperture indications (approximately 0.046 inches) (34), the presence of two pulses would be received by optical tape sensor (12) and sensed as the beginning-of-tape and end-of-tape apertures passed through the electromagnetic radiation pathway. Stray electromagnetic radiation is unlikely to randomly duplicate this pattern and could therefore be easily distinguished as electrical noise.

As shown in FIG. 2, it can be seen that in making such a sensing determination, pulses (23) are characterized by emission periods (24) and dormant periods (25). Emission periods (24) also have end of emission period point (26). For even more accuracy, optical tape position sensor (12) can be read occasionally and/or only at times corresponding to the end of emission period point (26), that is the sensor is not checked continuously by controller (26), that is the sensor is not checked continuously by controller (7). These aspects can afford two advantages. First, stray signals occurring during the dormant period would not be sensed even though they would be sufficient to trigger optical tape position sensor (12). To accomplish this the means for sensing, that is optical tape position sensor (12) can be sampled or read intermittently or occasionally. By reading the device occasionally at times which could be regular, noise at times when optical tape position sensor (12) is not read or sampled is irrelevant. In addition, synchronizing the sampling with the emissions of light emitting diode (14) affords greater filtering. Second, by appropriately choosing emission periods (24) to have durations which correspond to the response time of optical tape position sensor (12), optical tape position sensor (12) can be read at only times at which a true signal should be received. This aspect further adds to the element of time domain filtering by providing greater accuracy in avoiding inappropriate indications. Of course, it could be utilized even without any pulsing of light emitting diode (14).

Making dormant periods (25) less than the time it takes for aperture indications (34) to pass through the light pathway guarantees that at least one pulse will be received by optical tape position sensor (12). For even greater accuracy dormant periods (25) can be made less than half the time, insuring that at least two pulses will be received.

The foregoing discussion and the claims which follow describe the preferred embodiments of the present invention. Particularly, with respect to the claims, it should be understood that changes may be made without departing from its essence. In this regard, it is intended that such changes would still fall within the scope of the present invention. It simply is not practical to describe and claim all possible revisions to the present invention which may be accomplished. To the extent such revisions utilize the essence of the present invention each would naturally fall within the breath of protection encompassed by this patent. This is particularly true for the present invention since its basic concepts and understandings are fundamental in nature and can be broadly applied.

We claim:

1. A system for controlling a computer memory backup device utilizing magnetic tape cartridge media comprising:
   a. magnetic tape memory media having a plurality of aperture indications, wherein said apertures have a diameter;
   b. a media container for encasing said magnetic tape memory media;
   c. a drive mechanism for moving said magnetic tape memory media;
   d. a means for sensing the position of said aperture indications comprising:
      (1) a means for emitting electromagnetic radiation;
      (2) a means for receiving said electromagnetic radiation;
      (3) a means for directing said electromagnetic radiation from said means for emitting through at least one of said aperture indications in the magnetic tape memory media to said means for receiving; and
      (4) a means for focusing the transmission of said electromagnetic radiation from said means for emitting to said means for receiving at a focal point which approximately coincides with said magnetic tape media; and
   e. a means for controlling said drive mechanism wherein said means for controlling is responsive to said means for sensing the position of said aperture indications.

2. A system for controlling a computer memory backup device utilizing magnetic tape cartridge media as described in claim 1 wherein said means for directing comprises an optical pathway.

3. A system for controlling a computer memory backup device utilizing magnetic tape cartridge media as described in claim 2 wherein said optical pathway comprises a light pipe having an input end and an exit end, and wherein said means for focusing comprises an integral focusing lens on said exit end.

4. A system for controlling a computer memory backup device utilizing magnetic tape cartridge media comprising:
   a. magnetic tape memory media having a plurality of aperture indications, wherein said apertures have a diameter;
   b. a media container for encasing said magnetic tape memory media said container having a base;
   c. a drive mechanism for moving said magnetic tape memory media;
   d. a means for sensing the position of said aperture indications comprising:
      (1) a means for emitting electromagnetic radiation wherein said means for emitting is designed to output electromagnetic radiation at a maximum rated amplitude;
      (2) a means for receiving said electromagnetic radiation;
      (3) a means for directing said electromagnetic radiation from said means for emitting through at least one of said aperture indications in the magnetic tape memory media to said means for receiving; and (4) a means for pulsing said means for emitting, wherein said means for pulsing is independent of said container; and e. a means for controlling said drive mechanism wherein said means for controlling is responsive to said means for sensing the position of said aperture indications.

5. A system for controlling a computer memory backup device utilizing magnetic tape cartridge media as described in claim 4 wherein said means for receiving has a reaction time and wherein said means for pulsing creates repetitive emission and dormant periods of time for said means for emitting and wherein said emission period of time corresponds to said reaction time of said means for receiving.

6. A system for controlling a computer memory backup device utilizing magnetic tape cartridge media as described in claim 4 wherein said means for sensing is intermittently read by said means for controlling.

7. A system for controlling a computer memory backup device utilizing magnetic tape cartridge media as described in claim 5 wherein said means for sensing is intermittently read by said means for controlling.

8. A system for controlling a computer memory backup device utilizing magnetic tape cartridge media as described in claim 7 wherein said means for controlling reads said means for receiving at times corresponding to the end of said emission period.

9. A system for controlling a computer memory backup device utilizing magnetic tape cartridge media as described in claim 4 wherein said means for controlling reads said means for sensing intermittently.

10. A system for controlling a computer memory backup device utilizing magnetic tape cartridge media as described in claim 4 wherein said media travels a distance in time and wherein said means for pulsing creates repetitive emission and dormant periods of time for said means for emitting and wherein said dormant period of time is less than the time it takes for said media to travel a distance equal to said diameter of one of said aperture indications.

11. A system for controlling a computer memory backup device utilizing magnetic tape cartridge media as described in claim 10 wherein said dormant period of time is no more than one half the time it takes for said media to travel a distance equal to said diameter of one of said aperture indications.

12. A system for controlling a computer memory backup device utilizing magnetic tape cartridge media as described in claim 5, 10, or 11 wherein said means for emitting has a continuous current rating, wherein said electromagnetic radiation is emitted at an amplitude during said emission period, and wherein the average of said amplitude over both said emission and said dormant period together does not exceed said continuous current rating.

13. A system for controlling a computer memory backup device utilizing magnetic tape cartridge media comprising:

a. magnetic tape memory media having a plurality of aperture indications, wherein said apertures have a diameter;

b. a media container for encasing said magnetic tape memory media said container having a base;

c. a drive mechanism for moving said magnetic tape memory media;

d. a means for sensing the position of said aperture indications comprising:

(1) a means for emitting electromagnetic radiation wherein said means for emitting is designed to output electromagnetic radiation at a maximum rated amplitude;

(2) a means for receiving said electromagnetic radiation;

(3) a means for directing said electromagnetic radiation from said means for emitting through at least one of said aperture indications in the magnetic tape memory media to said means for receiving;

(4) a means for pulsing said means for emitting, wherein said means for pulsing is independent of said container; and (5) a means for separating said means for sensing from said container; and e. a means for controlling said drive mechanism wherein said means for controlling is responsive to said means for sensing the position of said aperture indications.

14. A system for controlling a computer memory backup device utilizing magnetic tape cartridge media comprising:

a. magnetic tape memory media having a plurality of aperture indications, wherein said apertures have a diameter;

b. a media container for encasing said magnetic tape memory media said container having a base;

c. a drive mechanism for moving said magnetic tape memory media;

d. a means for sensing the position of said aperture indications comprising:

(1) a means for emitting electromagnetic radiation wherein said means for emitting is designed to output electromagnetic radiation at a maximum rated amplitude;

(2) a means for receiving said electromagnetic radiation;

(3) a means for directing said electromagnetic radiation from said means for emitting through at least one of said aperture indications in the magnetic tape memory media to said means for receiving;

(4) a means for pulsing said means for emitting, wherein said means for pulsing is independent of said container;

(5) a means for separating said means for sensing from said container; and (6) a means for separating said means for receiving said electromagnetic radiation from said base and wherein said means for receiving is a phototransistor; and e. a means for controlling said drive mechanism wherein said means for controlling is responsive to said means for sensing the position of said aperture indications.

15. A system for controlling a computer memory backup device utilizing magnetic tape cartridge media comprising:

a. magnetic tape memory media having a plurality of aperture indications, wherein said apertures have a diameter;

b. a media container for encasing said magnetic tape memory media said container having a base;

c. a drive mechanism for moving said magnetic tape memory media;

d. a means for sensing the position of said aperture indications comprising:

(1) a means for emitting electromagnetic radiation wherein said means for emitting is designed to output electromagnetic radiation at a maximum rated amplitude;

(2) a means for receiving said electromagnetic radiation;

(3) a means for directing said electromagnetic radiation from said means for emitting through at least one of said aperture indications in the magnetic tape memory media to said means for receiving;

(4) a means for pulsing said means for emitting, wherein said means for pulsing is independent of said container;

(5) a means for separating said means for sensing from said container comprising:

i. a means for separating said means for receiving said electromagnetic radiation from said base and wherein said means for receiving is a phototransistor; and ii. a means for separating said means for emitting electromagnetic radiation from said base and wherein said means for emitting is a light emitting diode; and e. a means for controlling said drive mechanism wherein said means for controlling is responsive to said means for sensing the position of said aperture indications.

16. A system for controlling a computer memory backup device utilizing magnetic tape cartridge media comprising:

a. magnetic tape memory media having a plurality of aperture indications, wherein said apertures have a diameter;

b. a media container for encasing said magnetic tape memory media said container having a base;

c. a drive mechanism for moving said magnetic tape memory media;

d. a means for sensing the position of said aperture indications comprising:

(1) a means for emitting electromagnetic radiation wherein said means for emitting is designed to output electromagnetic radiation at a maximum rated amplitude;

(2) a means for receiving said electromagnetic radiation;

(3) a means for directing said electromagnetic radiation from said means for emitting through at least one of said aperture indications in the magnetic tape memory media to said means for receiving; and (4) a means for time domain filtering said electromagnetic radiation; and e. a means for controlling said drive mechanism wherein said means for controlling is responsive to said means for sensing the position of said aperture indications.

17. A system for controlling a computer memory backup device utilizing magnetic tape cartridge media as described in claim 16 wherein said means for time domain filtering comprises a means for testing for only two consecutive pulses.

18. A system for controlling a computer memory backup device utilizing magnetic tape cartridge media as described in claim 13, 14, 15, or 17 wherein said media travels a distance in time and wherein said means for pulsing creates repetitive emission and dormant periods of time for said means for emitting and wherein said dormant period of time is less than the time it takes for said media to travel a distance equal to said diameter of one of said aperture indications.

19. A system for controlling a computer memory backup device utilizing magnetic tape cartridge media as described in claim 18 wherein said dormant period of time is no more than one half the time it takes for said media to travel a distance equal to said diameter of one of said aperture indications.

20. A system for controlling a computer memory backup device utilizing magnetic tape cartridge media comprising:

a. magnetic tape memory media having aperture indications;

b. a media container for encasing said magnetic tape memory media;

c. a drive mechanism for moving said magnetic tape memory media;

d. a means for sensing the position of said aperture indications comprising:

(1) a means for emitting electromagnetic radiation wherein said means for emitting is designed to output electromagnetic radiation at a maximum rated amplitude;

(2) a means for receiving said electromagnetic radiation;

(3) a means for directing said electromagnetic radiation from said means for emitting through said aperture indications in the magnetic tape memory media to said means for receiving; and (4) a means for focusing the transmission of said electromagnetic radiation from said means for emitting to said means for receiving at a focal point which approximately coincides with said magnetic tape media; and (5) a means for pulsing said means for emitting, wherein said means for pulsing is independent of said container; and e. a means for controlling said drive mechanism wherein said means for controlling is responsive to said means for sensing the position of said aperture indications.

21. A system for controlling a computer memory backup device utilizing magnetic tape cartridge media as described in claim 20 wherein said means for directing comprises an optical pathway and wherein said optical pathway comprises a light pipe having an input end and an exit end, and wherein said means for focusing comprises an integral focusing lens on said exit end.

22. A system for controlling a computer memory backup device utilizing magnetic tape cartridge media as described in claim 21 wherein said means for sensing is read intermittently by said means for controlling.

23. A system for controlling a computer memory backup device utilizing magnetic tape cartridge media as described in claim 20 wherein said means for receiving has a reaction time and wherein said means for pulsing creates repetitive emission and dormant periods of time for said means for emitting and wherein said emission period of time corresponds to said reaction time of said means for receiving.

24. A system for controlling a computer memory backup device utilizing magnetic tape cartridge media as described in claim 23 wherein said media travels a distance in time and wherein said means for pulsing creates repetitive emission and dormant periods of time for said means for emitting and wherein said dormant period of time is less than the time it takes for said media to travel a distance equal to said diameter of one of said aperture indications.

25. A system for controlling a computer memory backup device utilizing magnetic tape cartridge media as described in claim 24 wherein said dormant period of time is no more than one half the time it takes for said media to travel a distance equal to said diameter of one of said aperture indications.

26. A system for controlling a computer memory backup device utilizing magnetic tape cartridge media comprising:
   a. magnetic tape memory media having aperture indications;
   b. a drive mechanism for moving said magnetic tape memory media;
   c. a means for sensing the position of said aperture indications comprising:
      (1) a means for emitting electromagnetic radiation wherein said means for emitting is designed to output electromagnetic radiation at a maximum rated amplitude;
      (2) a means for receiving said electromagnetic radiation;
      (3) a means for directing said electromagnetic radiation from said means for emitting through said aperture indications in the magnetic tape memory media to said means for receiving;
      (4) light pipe having an input end and an exit end;
      (5) an integral focusing lens on said exit end; and
      (6) a means for pulsing said means for emitting; and
   d. a means for controlling said drive mechanism wherein said means for controlling is responsive to said means for sensing the position of said aperture indications.

27. A system for controlling a computer memory backup device utilizing magnetic tape cartridge media as described in claim 26 wherein said means for receiving has a reaction time and wherein said means for pulsing creates repetitive emission and dormant periods of time for said means for emitting and wherein said emission period of time corresponds to said reaction time of said means for receiving.

28. A system for controlling a computer memory backup device utilizing magnetic tape cartridge media as described in claim 27 wherein said media travels a distance in time and wherein said means for pulsing creates repetitive emission and dormant periods of time for said means for emitting and wherein said dormant period of time is less than the time it takes for said media to travel a distance equal to said diameter of one of said aperture indications.

29. A system for controlling a computer memory backup device utilizing magnetic tape cartridge media as described in claim 28 wherein said dormant period of time is no more than one half the time it takes for said media to travel a distance equal to said diameter of one of said aperture indications.

30. A system for controlling a computer memory backup device utilizing magnetic tape cartridge media as described in claim 26 wherein said means for emitting has a continuous current rating, wherein said electromagnetic radiation is emitted at an amplitude during said emission period, and wherein the average of said amplitude over both said emission and said dormant period together does not exceed said continuous current rating.

* * * * *